April 24, 1951 W. O. OSBON 2,550,122
CONTROL SYSTEM
Filed July 17, 1947
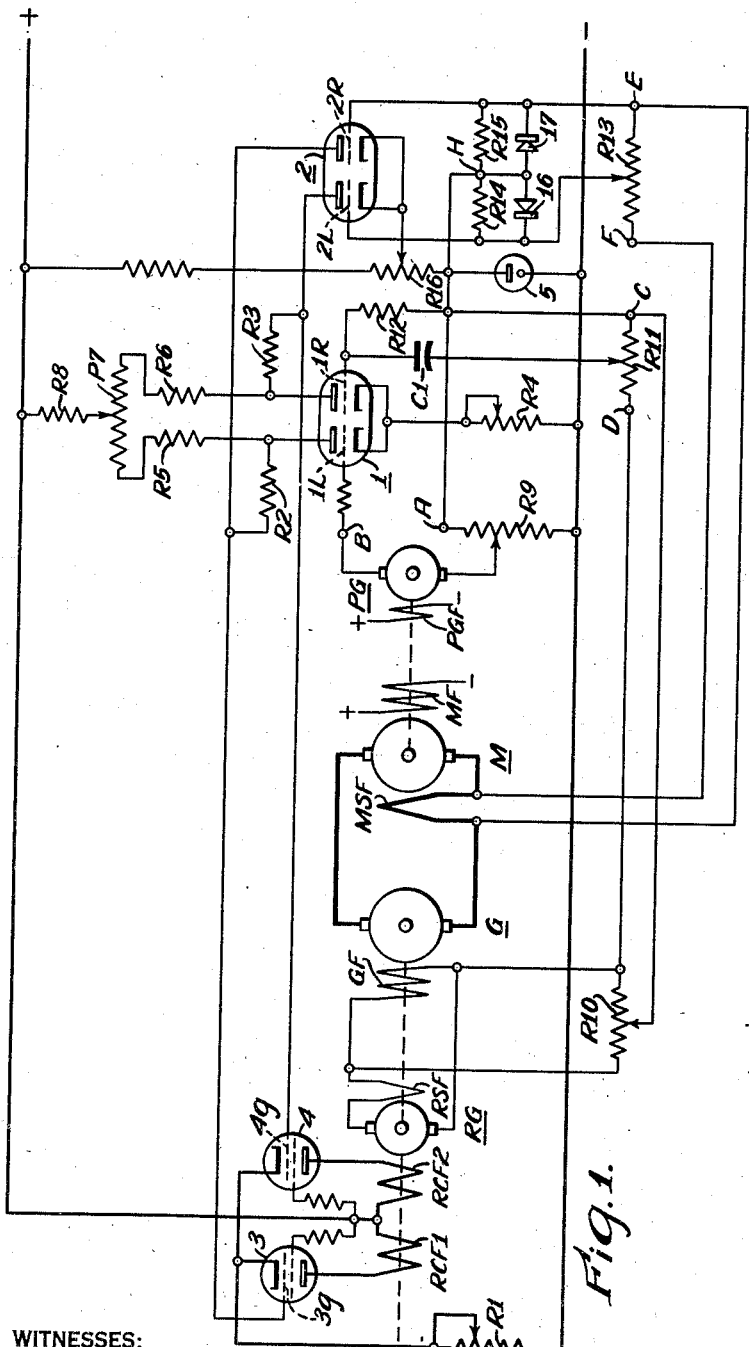
WITNESSES:
Robert C Baird
E. L. Obesheim
INVENTOR
William O. Osbon.
BY
Paul E. Friedemann
ATTORNEY Patented Apr. 24, 1951

2,550,122

UNITED STATES PATENT OFFICE 2,550,122

CONTROL SYSTEM

William O. Osbon, Pittsburgh, Pa., assignor to Westinghouse Electric Corporation, East Pittsburgh, Pa., a corporation of Pennsylvania Application July 17, 1947, Serial No. 761,520

21 Claims. (Cl. 318—145)

This invention relates generally to control systems and more in particular to electrical systems involving electronic components.

The invention as illustrated in the drawing is applied in the regulation of the speed of a motor. The invention is broad in application and may be utilized in a wide variety of other applications.

Regulating systems for motors frequently include a generator for energizing the motor, and an amplifier of the electronic type for controlling the excitation of the generator field system in response to some operating quantity of the motor, for example, motor speed error, motor current, etc. Additionally antihunt signals may be applied. For larger types of motors, a main generator may be used to energize the motor and a small regulating generator controlled by the amplifier used to excite the main generator.

The error signal together with other signals employed in a specific system are usually applied across individual series resistors in the grid circuit of the input side of the amplifier. In motor control systems of the type generally described, this arrangement frequently introduces difficulties because of insulation leakage resistance between the field and armature windings of the generator or generators in the system. In these systems, the amplifier power supply voltage and part of the output voltage appear between the generator field and armature windings. This voltage may be of the order of several hundred volts so that appreciable leakage current may flow as a consequence of the leakage resistance. Because of the circuit connections, this leakage current also flows through the series resistors in the grid circuit of the input side of the amplifier and produces extraneous voltage drops across the mentioned resistors which may cause system oscillation and poor regulator accuracy.

One object of this invention is to provide a regulating system which is simple in its components and positive in operation.

An equally important object of this invention is to provide a regulating system which is inherently fast in response to system variables which are to be controlled but which is yet relatively free of hunting.

Another object of this invention is to provide a regulating system in which the effect of unwanted system variables is minimized.

A specific object of this invention is to provide a regulating system in which extraneous currents of the system are confined to low impedance circuits and the effect of such currents on system operation thus made negligible.

Another specific object of this invention is to provide a system of the character referred to in which extraneous currents of one portion of the system are confined to low impedance circuits and do not flow through control elements in grid circuits of other portions of the system.

Yet a further object of this invention is to provide an electronic amplifier in which the grid circuits are effectively electrically isolated so as to be substantially unresponsive to electrical quantities of the system, of which the amplifier forms a part, other than the control quantities applied thereto.

The foregoing statements are merely illustrative of the objects of this invention. Other objects and advantages will become apparent upon a study of the following specification when considered in conjunction with the accompanying drawing, in which:

Figure 1 illustrates a control system for a motor embodying the principles of this invention, and Fig. 2 is a detail variation of a portion of the circuit of Fig. 1.

The electronic regulator illustrated in Fig. 1, is the proportional type, that is, the regulating effect is always proportional to the error signal. In the instant case, the quantity to be regulated is the speed of the motor M and the error signal is made proportional to a voltage. This is accomplished by the use of a D.-C. generator, herein termed a pilot generator PG, having a field winding PGF which is excited by a source of constant voltage. The pilot generator is driven by the motor M. Generator PG generates a voltage which varies linearly with its speed and, hence, its output is an accurate indication of actual motor speed. The voltage of the pilot generator PG is compared with a reference voltage appearing across the tube 5 and the resulting difference voltage constituting the error signal is applied to the input of the amplifier represented in tube 1 to produce the corrective stimulus necessary to restore the speed of the motor to a predetermined value.

Motor M is supplied by a generator G which is illustrated as having a single field winding GF. However, any suitable field system may be employed. The motor field MF may be connected to a suitable source of constant direct current. With the series connection of the motor and generator shown, speed control is effected by armature voltage variations.

The field winding GF of the generator is excited by a regulating generator RG. As shown, this generator is of the series type having a series field winding RSF and a pair of differentially related control field windings RCF1 and RCF2. In applications of this type, generators of the type of RG having shunt field windings rather than the series field illustrated, are frequently employed. Both generators are driven by the constant speed motor CSM.

Since the regulating system is of the proportional type, the motor speed must be corrected for any departure from that for which the system is adjusted. There must be no appreciable dead zone. As a consequence the regulating generator is required to supply suitable excitation to the field GF of the generator G to maintain the desired speed over the entire range of speed error including zero error and must, therefore, maintain its output at the necessay level when the excitation of its control fields is zero or the differential excitation thereof is zero in correspondence with zero speed error.

To meet this demand generator RG is of the self-energizing type and is adjusted to operate on its airgap line. Expressed otherwise, the slope of the resistance line of the load circuit of the regulating generator is adjusted to be substantially tangent to the initial straight line portion of the no-load saturation curve of the machine. This produces an operating characteristic wherein the generator may have an output anywhere along the tangent curves and this operating point is determined by the action of the control field. By way of illustration, should the motor speed fall, the speed error signal appearing as a current in the control field system urges the output of the regulating generator to a higher level and diminishes to zero in correspondence with the restoration of the motor speed to the preset level, at which point the regulating generator due to its self-energizing properties maintains the necessary output to hold the motor speed constant. A converse effect results from a drop in motor speed.

The control fields RCF1 and RCF2 of the regulating generator are excited by the output of the tubes 3 and 4 which are the output tubes of the amplifier. Tubes 3 and 4 are connected in push-pull relationship and are connected across the positive and negative power supply conductors indicated, the adjustable resistor R1 in the cathode circuit for both tubes being employed to establish the proper operating votlage of the output stage. Tubes 3 and 4 are controlled by the double triode tube 1 by the connection of the grids 3g and 4g, respectively, with the left and right plate circuits of tube 1 as viewed, the connection for grid 3g including resistor R2 and that for grid 4g including resistor R3, resistors R2 and R3 being of equal value.

Tube 1 is connected across the positive and negative power supply conductors, the cathode circuit including a series resistor R4 for determining the proper operating voltage of the input stage. The left and right plate circuits, respectively, include the resistors R5 and R6 having their extremities remote from the plates connected to opposite extremities of a potentiometer P7, the variable tap of which is connected through a resistor R8 with the positive conductor. The potentiometer P7 affords a trimming means for adjusting the two tube circuits of tube 1 to obtain the desired control characteristics, which in the instant case is to balance the control fields RCF1 and RCF2 for zero speed error.

In view of the action of tube 5 in the circuit, tending to maintain a constant voltage as a reference though small variations in current may occur, the voltage of point A is substantially a constant. Input voltage is applied between grid 1L and the point of fixed potential A to which grid 1R is connected. The drop across resistor R9 is less than the drop across R4 by the grid bias voltage. When the input voltage is zero, both grids have the same potential and the plate currents are equal, giving zero output voltage between the two plates of tube 1. When the potential of grid 1L is raised for example with respect to terminal A by an input voltage, the plate current of the left hand section of tube 1 is increased, increasing the drop across the cathode resistor R4. The net change in grid-to-cathode voltage for the left section of tube 1, is the input voltage minus the change in drop across the cathode resistor R4. It should be noted that the cathode voltage is raised by the change in drop across the cathode resistor R4. By reason of the common connection of the cathodes of the left and right tube sections, the cathode of the right tube section is raised an equal amount. Hence, if the grid 1R is at the fixed potential corresponding to point A, the grid-to-cathode voltage of the right section of tube 1 is of opposite polarity to that of the left section and equals the change in drop across cathode resistor R4. The resulting plate current drop in the right tube section tends to restore the current through the cathode resistor R4 to its original value. If the ohmic value of resistor R4 is high, say, of the order of resistors R5 and R6 and the associated sections of the potentiometer P7, the net change in current through resistor R4 is small and the net change in each grid to cathode voltage is approximately equal to half the input voltage. For this condition the output voltage changes across the resistors R5, R6 and the associated sections of potentiometer sections P7 are approximately balanced.

In this invention advantage is taken of the fact that except for the input voltage applied to the grid 1L, the grid circuits for tube 1 are essentially symmetrical. Thus, either grid may be used for the error signal, and if two signals must be accommodated, as in a regulator where feedback or antihunt signals are essential, both grids may be used, one for each signal.

In the drawing the pilot generator PG is connected between the terminal B in the circuit of grid 1L and a tap on the resistor R9. The input voltage to the grid 1L is thus the resultant of a comparison of the pilot generator voltage and the portion of the reference voltage applied across R9 and is the speed error signal or voltage. For the circuit arrangement illustrated the error voltage appears between terminals A and B and is applied to grid 1L. This voltage affects the grid 1L and the grid 1R in the manner described above.

This application utilizes a feedback voltage taken from the armature circuit of the regulating generator RG to effect system stability. The armature circuit voltage is applied across the terminals of a resistor R10 and a predetermined tapped portion thereof is applied across the resistor R11 at terminals C and D, the terminal C being common with terminal A, to control the grid 1R. This grid circuit additionally includes a capacitor C1 connected between a tap of resistor R11 and grid 1R forming a circuit paralleling grid resistor R12. This antihunt signal affects the grid 1R and the grid 1L as described for the application of input voltage to the grid 1L.

The output of the first stage comprising the double triode tube 1 is thus proportional to the sum of the speed error voltage and antihunt voltage.

The voltage appearing across grid resistor R12 in the circuit of grid 1R due to capacitor C1, is a function of the rate of change of the voltage of the regulating generator armature circuit. This same effect may be obtained with a transformer having the secondary substituted for resistor R12 and the primary connected across any one of resistors R11, R10 or the regulating generator armature circuit. The effect of this transient voltage is opposite to that of the voltage applied to grid 1L and the damping action thus produced has the effect of lengthening a time delay, the end result of which is to prevent oscillation of the system.

The important advantage of this arrangement is that terminals A and C are common and at constant potential with respect to the error and antihunt voltages. It will be observed that leakage currents through the insulation of the field winding and armature system of the regulating generator RG can flow only into terminals C and D. These terminals are ordinarily connected across either the armature circuit thereof or across a resistor in series therewith, both of which have a fairly low resistance, usually of the order of 5 to 100 ohms. The potential drop across C and D due to leakage currents, which are usually of the order of a few microamperes, is thus so low as to have negligible effect in the system. Furthermore, the leakage current circuit in the amplifier beyond terminal C does not include elements directly in the grid circuits of the tube 1, for the reason that a low impedance path to the negative side of the power supply is had through the tube 5, for example. Tests which have been made with the present regulating system indicate that the effect of insulation resistances as low as 50,000 ohms is insignificant. Ordinarily, insulation resistances are of the order of many megohms.

The function of the system thus far described is to regulate the motor for constant speed for any setting of the tap along resistor R9. Assuming a drop in speed of the motor M, the voltage of the grid 1L is lowered causing a reduction in current through the left section of the tube. Simultaneously the drop in cathode potential which follows has the effect of raising the grid-to-cathode voltage of the right section of the tube 1. This causes a rise in plate voltage of the left section of the tube and a corresponding drop in plate voltage of the right section of the tube driving grid $3g$ more positive and grid $4g$ less positive. As a consequence control field RCF1 carries a greater current than RCF2 and for the assumed condition the predominating excitation of field RCF1 produces a flux component in the regulating generator causing its output to increase. Meanwhile, the damping action of the antihunt control responsive to the rate of change of the regulating generator armature circuit voltage is operative to influence system stability.

As zero speed error is approached, the differential excitation of the regulating generator control fields diminishes and any tendency of the regulating generator to overshoot equlibrium is instantly opposed in a reversal of excitation thereof due to a rise in potential of grid 1L, grid $3g$, therefore, being lowered in potential while grid $4g$ is raised. The differential excitation is now due to the predominating effect of control field RCF2 tending to lower the output of regulating generator RG.

In practice, it is frequently desirable to operate a motor such as M over a wide speed range. Means for accomplishing this may take a variety of forms. A simplified arrangement is had in the provision of resistor R9 having an adjustable tap. By adjusting the tap on resistor R9, the motor speed may be raised and lowered due to the variation in requirement of output voltage of pilot generator PG which follows such adjustment. If rapid speed changes are made, either due to such speed adjustments or to varying motor load, current flowing in the armature circuit of the generator G and motor M could reach an excessive value. In such instances, a suitable current limiting control is essential.

The circuit including the double triode tube 2 provides a current limiting control. A current cue is obtained from the voltage drop across the series or commutating field MSF of the motor. This voltage is applied across the terminals E and F of resistor R13, a tapped portion of which including terminal E is applied across the symmetrical rectifier and resistor network including resistors R14 and R15 and is connected with the grids 2L and 2R to form part of the bias voltages applied thereto. The center tap H of this network is connected to the point of constant potential A. Grid biases below cut off are obtained by the connection of the cathodes of tube 2 to a point of potential above A on the resistor R16. Current flow in the motor generator armature circuit results in voltage drops across R14 and R15. For one direction of current, the drop across R14 opposes the voltage between the tap on R16 and point H, thus raising the potential of grid 2L with respect to its cathode, while the drop across R15 adds to the said voltage from R16 thus lowering the potential of grid 2R with respect to its cathode. It will be apparent, therefore, for either direction of current flow in the motor armature circuit, that one of the grids of tube 2 will be driven to a higher potential with respect to its cathode while the other will be driven lower. If the armature current exceeds a certain value determined by the setting of the tap on resistor R16, one or the other of grids 2L or 2R will be driven above the cutoff potential to permit conduction of that section of the tube.

The plate voltage supply for tube 2 flows through resistors R2 and R3 connecting the plates of tube 1 with the grids $3g$ and $4g$. The voltage across either resistor R2 or R3 due to plate current flow in the associated section of tube 2 opposes that due to the corresponding section of tube 1 and this voltage overpowers the voltage due to tube 1. The current limit control can thus drive one of the grids $3g$ or $4g$ depending upon the direction of motor armature current flow in a direction to maintain the motor armature current within a safe limit. For armature currents of opposite value, the opposite current limit grid will control the system.

The rectifiers 16 and 17 limit the drops across R14 and R15 when these voltages are of the polarity to add to the voltage derived from R16. Thus when the armature current is in a direction to make the left hand terminal of R14 positive, for example, the voltage across R14 is relatively large, whereas that across R15 is very small due to the shunting effect of rectifier 17 for currents of the assumed polarity. For oppositely directed armature currents, the reverse condition will prevail. The rectifiers thus approximately double the current limit sensitivity. If enough sensitivity is available, however, they may be omitted. Insulation leakage currents can flow into terminals E and F and through the resistors R14 and R15 paralleling the rectifiers. These resistors are sufficiently low in ohmic value that voltages across them due to leakage currents have insignificant effect on the current limit operation. Here also since the midpoint H of the resistors R14 and R15 is common with terminals A and C, leakage currents do not flow through elements in other grid circuits.

The common cathode resistor R1 for the output tubes 3 and 4 is of a relatively large ohmic value and is comparable in its effect to R4 of the tube 1, making the function of the output stage similar in its action to the input stage. Thus when the signal voltages applied to the grids 3g and 4g are unbalanced, as by the current limit circuit, the changes in the two plate currents remain essentially balanced, as described in connection with the operation of tube 1.

Fig. 2 shows a variation in the cathode circuit of tube 1. Individual cathode resistors R17 and R18 are used and a variable resistor R19 is connected between the cathode ends of these resistors. Minimum gain is obtained when the gain control resistance R19 is maximum.

While this invention has been illustrated in connection with a closed cycle regulating system, it will be apparent that a circuit system such as that including tube 1 may be applied equally well to open cycle systems or, more broadly, may be employed as an amplifier in an electrical system where several unrelated quantities are to be combined to produce a single output quantity. The foregoing disclosure and the showings made in the drawing are therefore merely illustrative of this invention and are not to be interpreted in a limiting sense. The only limitations are to be determined from the scope of the appended claims.

I claim as my invention:

1. Electronic control apparatus, responsive to a plurality of variable quantities, comprising respective positive and negative power supply leads, two circuits to be controlled extending across said power supply leads, electronic tube means having two discharge paths in said respective circuits and having respective control grids and a common cathode lead, a cathode resistor common to said two circuits and series-connected with said cathode lead, two grid circuits connected to said respective grids and extending both through said cathode resistor to said cathode lead, said grid circuits having a common point of potential and having constant-voltage means connected between said point and said negative lead to maintain the potential of said point at a constant value relative to said negative lead, first condition-responsive voltage supply means connected in one of said grid circuits between said point and one of said grids to provide variable grid voltage, and second condition-responsive voltage supply means connected in said other grid circuit between said point and said other grid to provide another variable grid voltage.

2. Electronic control apparatus responsive to a plurality of variable quantities, comprising a pair of tubes having a common cathode lead and respective anodes and respective control grids, current supply means having a negative lead and a positive lead, a cathode resistor series-connected between said cathode lead and said negative lead, two anode resistors each being connected between one of said respective anodes and said positive lead, two devices to be controlled in mutualy inverse relation having respective control circuits, each of said control circuits extending from one of said leads to a point between one of said respective anodes and the one appertaining anode resistor, two grid circuits connected to said respective grids and extending through said cathode resistor to said cathode lead, said grid circuits having a common point of potential and having constant-voltage means connected between said point and said negative lead to maintain the potential of said latter point at a constant positive value relative to the potential of said negative lead, first condition-responsive voltage supply means connected in one of said grid circuits between said latter point and one of said grids to provide variable grid voltage dependent upon one of said quantities, and second condition-responsive voltage supply means connected in said other grid circuit between said point and said other grid to provide variable grid voltage dependent upon another one of said quantities.

3. Electronic control apparatus, responsive to a plurality of variable quantities, comprising respective positive and negative power supply leads, two circuits to be controlled extending across said power supply leads, electronic tube means having two discharge paths in said respective circuits and having respective control grids and a common cathode lead, a cathode resistor common to said two circuits and series-connected with said cathode lead, two grid circuits connected to said respective grids and extending both through said cathode resistor to said cathode lead, said grid circuits having a common point of potential and having constant-voltage means connected between said point and said negative lead to maintain the potential of said point at a constant value relative to said negative lead, first condition-responsive voltage supply means connected in one said grid circuits between said point and one of said grids to provide variable grid voltage, an impedance member connected in said other grid circuit between said point and said other grid, and a variable-voltage circuit connected across said impedance member to impose thereon a voltage drop to act as another variable grid voltage.

4. Electronic control apparatus, responsive to a plurality of variable quantities, comprising respective positive and negative power supply leads, two circuits to be controlled extending across said power supply leads, electronic tube means having two discharge paths in said respective circuits and having respective control grids and a common cathode lead, a cathode resistor common to said two circuits and series-connected with said cathode lead, two grid circuits connected to said respective grids and extending both through said cathode resistor to said cathode lead, said grid circuits having a common point of a potential different from that of said negative lead, a potentiometric resistor connected between said point and said negative lead and having a tap intermediate said point and said negative lead, constant-voltage means including said potentiometric resistor and poled to maintain said potential at a fixed positive value relative to said negative lead, first condition-responsive voltage supply means series-connected in one of said grid circuits between said tap and one of said grids and poled to oppose the voltage drop which said potentiometric resistor has between said point and said tap so as to provide variable differential grid voltage, impedance means connected in said other grid circuit between said point and said other grid, and second condition-responsive voltage supply means including said impedance means to impress thereon another variable grid voltage.

5. Electronic control apparatus, responsive to a plurality of variable quantities, comprising respective positive and negative power supply leads, two circuits to be controlled extending across said power supply leads, electronic tube means having two discharge paths in said respective circuits and having respective control grids and a common cathode lead, a cathode resistor common to said two circuits and series-connected with said cathode lead, two grid circuits, each having a resistor connected to one of said respective grids and extending both said cathode resistor to said cathode lead, said grid circuits having a common point of potential and having constant-voltage means connected between said point and said negative lead to maintain the potential of said point at a constant value relative to said negative lead, said constant voltage means having low impedance in comparison with said cathode resistor, first condition-responsive voltage supply means connected in one of said grid circuits between said point and one of said grids to provide variable grid voltage, and second condition-responsive voltage supply means connected in said other grid circuit between said point and said other grid to provide another variable grid voltage.

6. Electronic control apparatus responsive to a plurality of variable quantities, comprising a pair of tubes having a common cathode lead and respective anodes and respective control grids, respective positive and negative power supply leads, a cathode resistor series-connected between said cathode lead and said negative lead, two anode resistors each being connected between one of said respective anodes and said positive lead, two devices to be controlled in mutually inverse relation having respective control circuits, each of said control circuits extending from one of said leads to a point between one of said respective anodes and the one appertaining anode resistor, two grid circuits, extending from said respective grids through said cathode resistor, first variable-voltage supply means connected with one of said grid circuits between said cathode resistor and one of said grids to apply a first control voltage in accordance with one of said quantities, second variable-voltage supply means connected with said other grid circuit between said cathode resistor and said other grid to apply a second control voltage in accordance with another quantity, and third variable-voltage supply means connected with said anode resistors to supply a third control voltage responsive to a third quantity.

7. Electronic control apparatus responsive to a plurality of variable quantities, comprising a pair of tubes having a common cathode lead and respective anodes and respective control grids, respective positive and negative power supply leads, a cathode resistor series-connected between said cathode lead and said negative lead, two anode resistors each being connected between one of said respective anodes and said positive lead, two devices to be controlled in mutually inverse relation having respective control circuits, each of said control circuits extending from one of said leads to a point between one of said respective anodes and the one appertaining anode resistor, two grid circuits, extending from said respective grids through said cathode resistor and having a common point of potential and constant-voltage means connected between said point and said negative lead to maintain said potential at a fixed difference from that of said negative lead, first condition-responsive voltage supply means connected in one of said grid circuits between said point and one of said grids to provide variable grid voltage, and second condition-responsive voltage supply means connected in said other grid circuit between said point and said other grid to provide another variable grid voltage, and third condition-responsive voltage supply means having a circuit extending across said two anode resistors to impress a variable control voltage thereon.

8. Apparatus for producing an electrical control quantity in dependence of three control voltages comprising, in combination, a pair of tubes having respective anodes and respective control grids and a common cathode lead, electrical impedance means series-connected with said cathode lead, power supply means connected across said tubes through said impedance means so that a change in voltage across said impedance means due to a change in cathode current in one tube produces a corresponding change in grid-to-cathode voltage of the other tube, constant-voltage means forming a point of fixed potential and having a low impedance compared with said member, from said point to one side of said power supply means, two circuits connecting said respective grids to said point of potential, one of said circuits having variable-voltage supply means for applying one control voltage to one of said grids, said other circuit having variable-voltage supply means for applying a second of said control voltages to said other grid, a second pair of tubes having respective anodes and respective control grids and a common cathode lead, resistance means connecting the grids of the second pair of tubes with each other, circuit means connecting a point of said resistance means to said point of potential, circuit means connecting the cathodes of said second pair of tubes to one side of said power supply means, circuit means connecting the anodes of said second pair of tubes with said respective anodes of said first pair of tubes for effecting an algebraic combination of the electrical outputs of said first pair and second pair of tubes, and circuit means connected across said resistance means for applying thereto the third of said three control voltages.

9. Apparatus for producing an electrical control quantity in dependence of three control voltages comprising, in combination, a first pair of grid-controlled tubes, electrical impedance means forming a common cathode circuit for said first pair of tubes, power supply means connected across said tubes through said impedance means so that a change in voltage across said electrical impedance means due to cathode current in one tube produces a corresponding change in voltage of the cathode of the other tube, constant voltage means providing a point of constant potential and forming a low impedance path between said point and one side of said power supply means, to circuits connecting the respective control grids of said tubes to said point of potential, variable-voltage supply means connected with one of said circuits for applying one control voltage to the grid of one tube, variable-voltage supply means connected with said other circuit for applying a second of said control voltages to the control grid of the other tube, a second pair of grid-controlled tubes, a resistor connecting the anode of one of the second pair of tubes with the anode of one of the first pair of tubes, a resistor connecting the anode of the other tube of said second pair with the anode of the other tube of said first pair, electrical impedance means connecting the cathodes of said second pair of tubes to said point of potential, resistance means interconnecting the grids of the second pair of tubes, circuit means connecting a point of said resistance means with said point of potential, and circuit means connected across said resistance means for applying thereto the third of said three control voltages.

10. Apparatus for producing an electrical quantity of substantially constant magnitude comprising, in combination, controllable electric tranlating means for producing said electrical quantity, a pair of tubes having respective plate circuits connected with said translating means for controlling the latter and having respective control grids, said tubes having a cathode impedance member in common, electric power supply means connected across said plate circuits through said member, variable-voltage supply means responsive to said quantity and connected between said member and one of said grids, variable-voltage supply means responsive to the rate of change of said quantity and connected between said member and said other grid.

11. Apparatus for producing a regulated electrical quantity comprising, in combination, a pair of grid-controlled tubes having a cathode resistor in common, power supply means connected across said tubes through said cathode resistor, constant-voltage means providing a point of constant potential and having a low impedance path from said point to one side of said power supply means, variable-voltage supply means connected between the grid of one of said tubes and said point for applying a control potential to said grid, a grid resistor connecting the grid of said other tube to said point, resistance means having one terminal connected to said point, a capacitor connected on one side between the grid of said other tube and said grid resistor and connected on the other side to said resistance means, and circuit means connected across said resistance means for applying variable control voltage, said electrical quantity appearing across the anodes of said pair of tubes.

12. Electronic apparatus, comprising a pair of tubes having respective plate circuits and respective control grids, said tubes having a cathode resistor in common, power supply means connected across said plate circuits through said cathode resistor, potentiometric means connected across said power supply means to provide an intermediate point of potential and having between said point and one side of said power supply means a low impedance compared with the impedance of said cathode resistor, variable-voltage supply means connected between said point and the grid of one of said tubes for providing a first grid control voltage, a grid resistor connected between said point and the grid of the other tube, a variable-voltage circuit connected across said grid resistor for providing a second grid control voltage, and means connected with said plate circuits to be controlled in dependence upon said first and second voltages.

13. Electronic apparatus, comprising a pair of tubes having respective plate circuits and respective control grids, said tubes having a cathode resistor in common, power supply means connected across said plate circuits through said cathode resistor, potentiometric means connected across said power supply means to provide an intermediate point of potential and having between said point and one side of said power supply means a low impedance compared with the impedance of said cathode resistor, variable-voltage supply means connected between said point and the grid of one of said tubes for providing a first grid control voltage, a grid resistor connected between said point and the grid of the other tube, a capacitor and a resistance member connected in series with each other across said grid resistor, variable-voltage supply means connected across said resistance member for applying a second grid control voltage, and means connected with said plate circuits to be controlled in dependence upon said two voltages.

14. Electronic apparatus comprising a first pair of grid-controlled tubes having a cathode resistor in common, power supply means connected across said tubes through said cathode resistor, a voltage divider circuit providing a point of potential and forming a low impedance path from said point to the negative side of said power supply means, variable-voltage supply means connected between the grid of one of said tubes and said point for applying a control potential to said grid a grid resistor connecting the grid of the other tube to said point, capacitor means paralleling said grid resistor, voltage supply means connected with said capacitor for charging said capacitor, a second pair of grid-controlled tubes, having a common cathode circuit connected to said voltage divider circuit at another point of higher potential than that of said first-mentioned point so that the cathode potential of the second pair is above that of the first pair of tubes, a first plate resistor connecting the plate of one of the second pair of tubes with the plate of one of the first pair of tubes, a second plate resistor interconnecting the plates of the other tubes, resistance means interconnecting the grids of the second pair of tubes and having a center tap connected to said first-mentioned point of potential, two rectifiers connected in series-opposed relation to each other across said resistance means and having a common terminal point connected with said tap, variable-voltage supply means connected across said resistance means for applying thereto another control voltage, and a circuit to be controlled extending axially through said two plate resistors to be responsive to the voltage differential between said plate resistors.

15. Electronic control apparatus, comprising a first pair of tubes having respective plate circuits and respective control grids and having a cathode resistor in common, respective positive and negative power leads connected across said tubes through said cathode resistor, a voltage divider connected across said power supply means and having a point of potential intermediate the potentials of said respective power leads, said grids being connected with said point of potential, circuit means for supplying variable control voltage disposed between said point and one of said grids, a second pair of tubes having respective plate circuits connected across said power leads and having respective grids, and a common cathode lead, said cathode lead being connected to said voltage divider at another point having a higher potential than said first-mentioned point, resistance means interconnecting said grids of said second tube pair and having a tap substantially in its electrical center connected with said first point of potential, variable-voltage supply means connected across said resistance means for supplying another control voltage, two resistors connecting the respective plate circuits of said second pair into the respective plate circuits of said second pair, and a circuit to be controlled extending serially through said two latter resistors to be responsive to said two control voltages.

16. In combination, electric means to be controlled having two opposingly inter-related control circuits, respective positive and negative current supply leads, two discharge tubes series connected with said respective control circuits between said leads and having a common cathode lead connected with said negative lead, said tubes having respective discharge control means, a pair of control tubes interconnected in push-pull relation and having respective anode resistance circuits connected with said positive lead and a common cathode resistor connected with said negative lead, two resistors each connected between one of said respective control means and a point of one of said respective anode resistance circuits, said control tubes having respective control grids, constant voltage means connected with said negative lead to provide a point of constant positive potential relative to said negative lead, two circuit connections between said point and said respective grids, and variable-voltage supply means disposed in one of said connections for providing grid control voltage for said control tubes.

17. In combination, electric means to be controlled having two opposingly inter-related control circuits, respective positive and negative current supply leads, two discharge tubes series connected with said respective control circuits between said leads and having respective control grids and a common cathode resistor, a pair of control tubes interconnected in push-pull relation and having respective anode resistance circuits connected with said positive lead and a common cathode resistor connected with said negative lead, two resistors each connected between one of said respective control grids and a point of one of said respective anode resistance circuits, said control tubes having respective grids, constant voltage means connected with said negative lead to provide a point of constant positive potential relative to said negative lead, two circuit connections between said point and said respective grids, adjustable voltage means to provide a reference voltage and condition-responsive voltage supply means connected in series opposition to each other in one of said circuit connections for differentially controlling said control tubes.

18. In combination, an electric load circuit to be controlled for a given electric quantity, said circuit having two opposingly active control means, power supply means, two controllable discharge tubes connected in series with said respective control means across said supply means and having respective discharge control circuits, a pair of push-pull control tubes connected across said power supply means and having respective anode circuits and a common cathode resistor and respective grids, said discharge control circuits having respective control resistors connected to said respective anode circuits, a voltage divider circuit connected across said power supply means to provide a point of positive potential relative to the negative side of said supply means, variable-voltage supply means responsive to said quantity and connected between said point and one of said control tube grids to provide control dependent upon changes of said quantity, grid circuit means connecting said point with said other control tube grid and having a reactive impedance member, and variable-voltage supply means responsive to said quantity and connected with said reactive impedance means to provide control dependent upon the rate of change of said quantity.

19. In combination, an electric load circuit to be controlled for a given electric quantity, said circuit having two opposingly active control means, power supply means, two controllable discharge tubes connected in series with said respective control means across said supply means and having respective discharge control circuits, a pair of push-pull control tubes connected across said power supply means and having respective anode circuits and a common cathode resistor and respective grids, said discharge control circuits having respective control resistors connected to said respective anode circuits, a voltage divider circuit connected across said power supply means to provide a point of positive potential relative to the negative side of said supply means, respective circuit connection between said control tube grids and said point, one of said connections including source means of adjustable reference voltage and source means of variable voltage responsive to said quantity, said two source means being connected in series opposition to each other for controlling said load circuit to maintain said quantity substantially at a value determined by said reference voltage, and another pair of tubes connected across said power supply means and having a common cathode lead and having respective anode circuits extending through said respective control resistors, said latter tubes having respective grids, resistance means interconnecting said latter grids and having a tap connected to said point, bias means between said point and said cathode lead to normally maintain said two latter tubes non-conductive, and current-responsive circuit means including said resistance means and connected to said load circuit for rendering either of said latter two tubes conductive when the current in said load circuit exceeds a given value whereby said discharge tubes are controlled to limit said current substantially to said value.

20. With a reversible electric drive having a motor and two split-field windings for controlling said motor, in combination, an electronic speed control system comprising current supply means having two discharge devices connected with said respective windings for energizing said windings and having respective discharge control circuits each including a control resistor, a pair of control tubes interconnected in push-pull relation and having each an anode circuit connected to one of said respective control resistors, said control tubes having respective control grids and a common cathode resistor, respective positive and negative leads across which said tubes are connected in series with said anode circuits and cathode resistor, constant-voltage means providing a point of constant potential relative to said negative lead and having low impedance, compared with said cathode resistor, between said point and said negative lead, adjustable voltage means for providing a reference voltage in accordance with a desired drive speed, variable voltage means connected with said drive for providing a signal voltage proportional to the speed of said motor, said adjustable voltage means and said variable voltage means being connected between said point and one of said grids, a grid resistor connecting said other grid with said point, a capacitive impedance circuit connected across said grid resistor and having voltage supply means for varying the changing voltage of said capacitive circuit for limiting the rate of speed change of said drive, another pair of normally non-conductive tubes connected between said leads and having respective anode circuits extending through said respective control resistors, said latter two tubes having respective grids, resistance means connected across said latter two grids and having a tap connected with said point, and a control circuit electrically connected to said motor to provide a voltage dependent upon the current of said motor and connected with said resistance means to impress thereon said latter voltage for rendering one of said latter two tubes conductive when said current exceeds a given value whereby said discharge devices are controlled to limit said current substantially to said value.

21. With a reversible electric drive having a motor and two split-field windings for controlling said motor, in combination, an electronic speed control system comprising current supply means having two discharge devices connected with said respective windings for energizing said windings and having respective discharge control circuits each including a control resistor, a pair of control tubes interconnected in push-pull relation and having each an anode circuit connected to one of said respective control resistors, said control tubes having respective control grids and a common cathode resistor, respective positive and negative leads across which said tubes are connected in series with said anode circuits and cathode resistor, a voltage divider connected across said leads and having a point of positive potential, compared with said negative lead, which is connected to said grids, speed-proportional voltage supply means interposed between said point and one of said grids, another pair of tubes having cathodes connected to said voltage divider at a point more positive than the first-mentioned point so that said other tubes are normally non-conductive, said other tubes having respective grids and having respective anode circuits extending through said respective control resistors, resistance means connected across said grids of said other tubes and having a midtap connected with said first-mentioned point of potential, and a control circuit electrically connected to said motor to provide a voltage dependent upon the current of said motor and connected with said resistance means to impress thereon said latter voltage for rendering one of said latter two tubes conductive when said current exceeds a given value whereby said discharge devices are controlled to limit said current substantially to said value.

WILLIAM O. OSBON.

REFERENCES CITED

The following references are of record in the file of this patent:

UNITED STATES PATENTS

| Number    | Name       | Date          |
|-----------|------------|---------------|
| 1,832,609 | Ashbaugh   | Nov. 17, 1931 |
| 2,121,588 | Eames      | June 21, 1938 |
| 2,175,017 | Cockrell   | Oct. 3, 1939  |
| 2,287,835 | Satterlee  | June 30, 1942 |
| 2,354,930 | Stratton   | Aug. 1, 1944  |
| 2,356,567 | Cockrell   | Aug. 22, 1944 |
| 2,387,795 | Isserstedt | Oct. 30, 1945 |
| 2,409,312 | Reeves     | Oct. 15, 1946 |
| 2,441,387 | Berger et al. | May 11, 1948 |
| 2,444,261 | Kelling    | June 29, 1948 |